United States Patent
Goshen

(10) Patent No.: US 9,559,815 B1
(45) Date of Patent: Jan. 31, 2017

(54) GENERATION OF OFDM SYMBOLS

(71) Applicant: FriskyDSP Technology LTD., Netanya (IL)

(72) Inventor: Tomer Goshen, Tel Aviv (IL)

(73) Assignee: FriskyDSP Technology Ltd., Netanya (IL)

( * ) Notice: Subject to any disclaimer, the term of this patent is extended or adjusted under 35 U.S.C. 154(b) by 0 days.

(21) Appl. No.: 14/835,802

(22) Filed: Aug. 26, 2015

(51) Int. Cl.
*H04L 27/28* (2006.01)
*H04L 5/00* (2006.01)

(52) U.S. Cl.
CPC .................... *H04L 5/0005* (2013.01)

(58) Field of Classification Search
CPC .... H04L 5/0007; H04L 5/005; H04L 27/2675; H04L 27/2618; H04L 27/2614; H04L 27/2615; H04L 27/2623; H04L 27/3405; H04L 27/3411; H04L 27/3444
USPC ......... 375/260, 262, 285, 296, 298; 370/208
See application file for complete search history.

(56) References Cited

U.S. PATENT DOCUMENTS

| | | | | |
|---|---|---|---|---|
| 8,582,687 | B2 * | 11/2013 | Terry | H04L 27/2615 370/208 |
| 2004/0114551 | A1 * | 6/2004 | Gavillero Martin | H04B 3/54 370/324 |
| 2006/0262868 | A1 * | 11/2006 | Leshem | H04L 27/2657 375/260 |
| 2007/0140367 | A1 * | 6/2007 | Braithwaite | H04L 27/2614 375/260 |
| 2010/0303182 | A1 * | 12/2010 | Daneshrad | H04B 1/10 375/346 |

* cited by examiner

*Primary Examiner* — Khanh C Tran
(74) *Attorney, Agent, or Firm* — Reches Patents

(57) ABSTRACT

A method for generating a modified orthogonal frequency division multiplexing (OFDM) symbol, the method may include generating, for each pair of FDR error and outer OFDM symbol constellation sample that belong to a same sub-carrier, a modified OFDM symbol constellation sample thereby providing multiple modified OFDM symbol constellation samples; and calculating the modified OFDM symbol; wherein the calculating of the modified OFDM symbol comprises performing a frequency domain to time domain conversion of (a) the multiple modified OFDM symbol constellation samples and (b) unmodified OFDM symbol constellation samples.

20 Claims, 8 Drawing Sheets

300

420

430

GENERATION OF OFDM SYMBOLS

FIELD OF THE INVENTION

The present invention relates to generating OFDM symbols that will increase the efficiency of high power amplifiers.

BACKGROUND OF THE INVENTION

One of the major problems in OFDM modulations is high Peak-to-Average Power Ratio (PAPR) of transmitted OFDM signals. Therefore, the OFDM receiver's detection efficiency is very sensitive to the nonlinear devices used in its signal processing loop, such as Digital-to-Analog Converter (DAC) and High Power Amplifier (HPA), which may severely impair system performance due to induced spectral regrowth and detection efficiency degradation.

For example, most radio systems employ the HPA in the transmitter to obtain sufficient transmits power and the HPA is usually operated at or near the saturation region to achieve the maximum output power efficiency, and thus the memoryless nonlinear distortion due to high PAPR of the input signals will be introduced into the communication channels.

If the HPA is not operated in linear region with large power back-off, it is impossible to keep the out-of-band power below the specified limits. This situation leads to very inefficient amplification and expensive transmitters.

When a HPA have a high dynamic range, it exhibits poor power efficiency. It has been shown that PAPR reduction can significantly save the power, in which the net power saving is directly proportional to the desired average output power and it is highly dependent upon the clipping probability level. Suppose that an ideal linear model for HPA, where linear amplification is achieved up to the saturation point, and thus we obtain:

$$\eta = \frac{0.5}{PAPR}$$

To illustrate the power inefficiency of a HPA in terms of the PAPR, we give an example of OFDM signals with 256 subcarriers and its CCDF has been shown in FIG. 6.

In order to guarantee that probability of the clipped OFDM frames is less than 0.01%, we need to apply an input backoff (IBO) equivalent to the PAPR at the $10^{-4}$ probability level, i.e. (25.235), referring to the FIG. 6, and thus the efficiency of HPA becomes ~1.98

Therefore, so low efficiency is a strong motivation to reduce the PAPR in OFDM systems.

As shown in FIG. 7, different curves of the CCDF have been given for random original OFDM symbols generated and different PAPR reduction schemes. From FIG. 6, it is very clear that all schemes can reduce the PAPR largely in OFDM system. However, their performances of the PAPR reduction are different.

For example, when the PAPRs are 2.6 dB, 4.5 dB, 6.6 dB, 6.8 dB, 6.9 dB and 11.7 dB for the exponential companding, error companding, PTS, TR, clipping scheme and original OFDM signals, respectively. Obviously, the signals compounded by the nonlinear companding transform with exponential function can reduce the PAPR largest and the PAPR reduction of the clipping scheme is the smallest among these typical methods. Although clipping scheme can improve its performance of the PAPR reduction through reducing its preset clipping level A.

However, the performance of the BER will be degraded largely when its preset clipping level is reduced.

FIG. 7 depicts the performance of BER versus SNR of actual OFDM signals with PAPR reduction based on different schemes over the AWGN channel, in which the typical HPA of the Solid State Power Amplifier (S SPA) has been considered. Note that SSPA produces no phase distortion and only the AM/AM conversion. In FIG. 7, the performance bounds are obtained by ignoring the effect of SSPA and directly transmitting the original OFDM signals through the AWGN channels. Generally speaking, the performances of the BER with different PAPR reduction schemes have some degradation from FIG. 7. Specifically, to achieve a BER of the minimum required SNR is 13.8 dB (performance bound).

There is a growing need to provide efficient systems, computer readable media and method for generating modified OFDM symbols that will comply with reduced peak to average ration requirements.

SUMMARY

According to an embodiment of the invention there may be provided a method for generating a modified orthogonal frequency division multiplexing (OFDM) symbol, the method may include receiving OFDM symbol constellation samples of the OFDM symbol; wherein the OFDM symbol constellation samples belong to a given constellation; searching, in the OFDM symbol constellation samples, for outer OFDM symbol constellation samples that are located on a boundary of the given constellation; converting the OFDM symbol constellation samples to time-domain OFDM (TDO) samples; searching for residual TDOS samples that have an intensity that exceed an intensity threshold; calculating, for each residual TDOS sample, a residual error; wherein the residual error has a phase that equals a phase of the residual TDOS sample and an amplitude that equals a difference between an amplitude of the residual TDIS sample and the intensity threshold converting the residual errors to frequency domain residual (FDR) errors; generating, for each pair of FDR error and outer OFDM symbol constellation sample that belong to a same sub-carrier, a modified OFDM symbol constellation sample thereby providing multiple modified OFDM symbol constellation samples; and calculating the modified OFDM symbol; wherein the calculating of the modified OFDM symbol comprises performing a frequency domain to time domain conversion of (a) the multiple modified OFDM symbol constellation samples and (b) unmodified OFDM symbol constellation samples.

According to an embodiment of the invention there may be provided a non-transitory computer readable that stores instructions that once executed by a computer causes the computer to execute the steps of receiving OFDM symbol constellation samples of the OFDM symbol; wherein the OFDM symbol constellation samples belong to a given constellation; searching, in the OFDM symbol constellation samples, for outer OFDM symbol constellation samples that are located on a boundary of the given constellation; converting the OFDM symbol constellation samples to time-domain OFDM (TDO) samples; searching for residual TDOS samples that have an intensity that exceed an intensity threshold; calculating, for each residual TDOS sample, a residual error; wherein the residual error has a phase that equals a phase of the residual TDOS sample and an amplitude that equals a difference between an amplitude of the residual TDIS sample and the intensity threshold converting the residual errors to frequency domain residual (FDR) errors; generating, for each pair of FDR error and outer OFDM symbol constellation sample that belong to a same sub-carrier, a modified OFDM symbol constellation sample thereby providing multiple modified OFDM symbol constellation samples; and calculating the modified OFDM symbol; wherein the calculating of the modified OFDM symbol comprises performing a frequency domain to time domain conversion of (a) the multiple modified OFDM symbol constellation samples and (b) unmodified OFDM symbol constellation samples.

According to an embodiment of the invention there may be provided a device that comprises at least one processor that is configured to execute the steps of receiving OFDM symbol constellation samples of the OFDM symbol; wherein the OFDM symbol constellation samples belong to a given constellation; searching, in the OFDM symbol constellation samples, for outer OFDM symbol constellation samples that are located on a boundary of the given constellation; converting the OFDM symbol constellation samples to time-domain OFDM (TDO) samples; searching for residual TDOS samples that have an intensity that exceed an intensity threshold; calculating, for each residual TDOS sample, a residual error; wherein the residual error has a phase that equals a phase of the residual TDOS sample and an amplitude that equals a difference between an amplitude of the residual TDIS sample and the intensity threshold converting the residual errors to frequency domain residual (FDR) errors; generating, for each pair of FDR error and outer OFDM symbol constellation sample that belong to a same sub-carrier, a modified OFDM symbol constellation sample thereby providing multiple modified OFDM symbol constellation samples; and calculating the modified OFDM symbol; wherein the calculating of the modified OFDM symbol comprises performing a frequency domain to time domain conversion of (a) the multiple modified OFDM symbol constellation samples and (b) unmodified OFDM symbol constellation samples.

According to an embodiment of the invention there may be provided a method for generating a modified OFDM symbol, the method may include receiving OFDM symbol constellation samples of the OFDM symbol; wherein the OFDM symbol constellation samples belong to a given constellation; converting the OFDM symbol constellation samples to time-domain OFDM (TDO) samples; searching for residual TDO samples that have an intensity that exceed an intensity threshold; calculating, for each residual TDOS sample, a residual error; wherein the residual error has a phase that equals a phase of the residual TDOS sample and an amplitude that equals a difference between an amplitude of the residual TDIS sample and the intensity threshold converting the residual errors to frequency domain residual (FDR) errors; clipping each FDR error to conform with an error vector magnitude to provide a clipped residual FDR error thereby providing multiple modified OFDM symbol constellation samples; and calculating the modified OFDM symbol; wherein the calculating of the modified OFDM symbol comprises performing a frequency domain to time domain conversion of the multiple modified OFDM symbol constellation samples.

According to an embodiment of the invention there may be provided a non-transitory computer readable that stores instructions that once executed by a computer causes the computer to execute the steps of receiving OFDM symbol constellation samples of the OFDM symbol; wherein the OFDM symbol constellation samples belong to a given constellation; converting the OFDM symbol constellation samples to time-domain OFDM (TDO) samples; searching for residual TDO samples that have an intensity that exceed an intensity threshold; calculating, for each residual TDOS sample, a residual error; wherein the residual error has a phase that equals a phase of the residual TDOS sample and an amplitude that equals a difference between an amplitude of the residual TDIS sample and the intensity threshold converting the residual errors to frequency domain residual (FDR) errors; clipping each FDR error to conform with an error vector magnitude to provide a clipped residual FDR error thereby providing multiple modified OFDM symbol constellation samples; and calculating the modified OFDM symbol; wherein the calculating of the modified OFDM symbol comprises performing a frequency domain to time domain conversion of the multiple modified OFDM symbol constellation samples.

According to an embodiment of the invention there may be provided a device that comprises at least one processor that is configured to execute the steps of receiving OFDM symbol constellation samples of the OFDM symbol; wherein the OFDM symbol constellation samples belong to a given constellation; converting the OFDM symbol constellation samples to time-domain OFDM (TDO) samples; searching for residual TDO samples that have an intensity that exceed an intensity threshold; calculating, for each residual TDOS sample, a residual error; wherein the residual error has a phase that equals a phase of the residual TDOS sample and an amplitude that equals a difference between an amplitude of the residual TDIS sample and the intensity threshold converting the residual errors to frequency domain residual (FDR) errors; clipping each FDR error to conform with an error vector magnitude to provide a clipped residual FDR error thereby providing multiple modified OFDM symbol constellation samples; and calculating the modified OFDM symbol; wherein the calculating of the modified OFDM symbol comprises performing a frequency domain to time domain conversion of the multiple modified OFDM symbol constellation samples.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
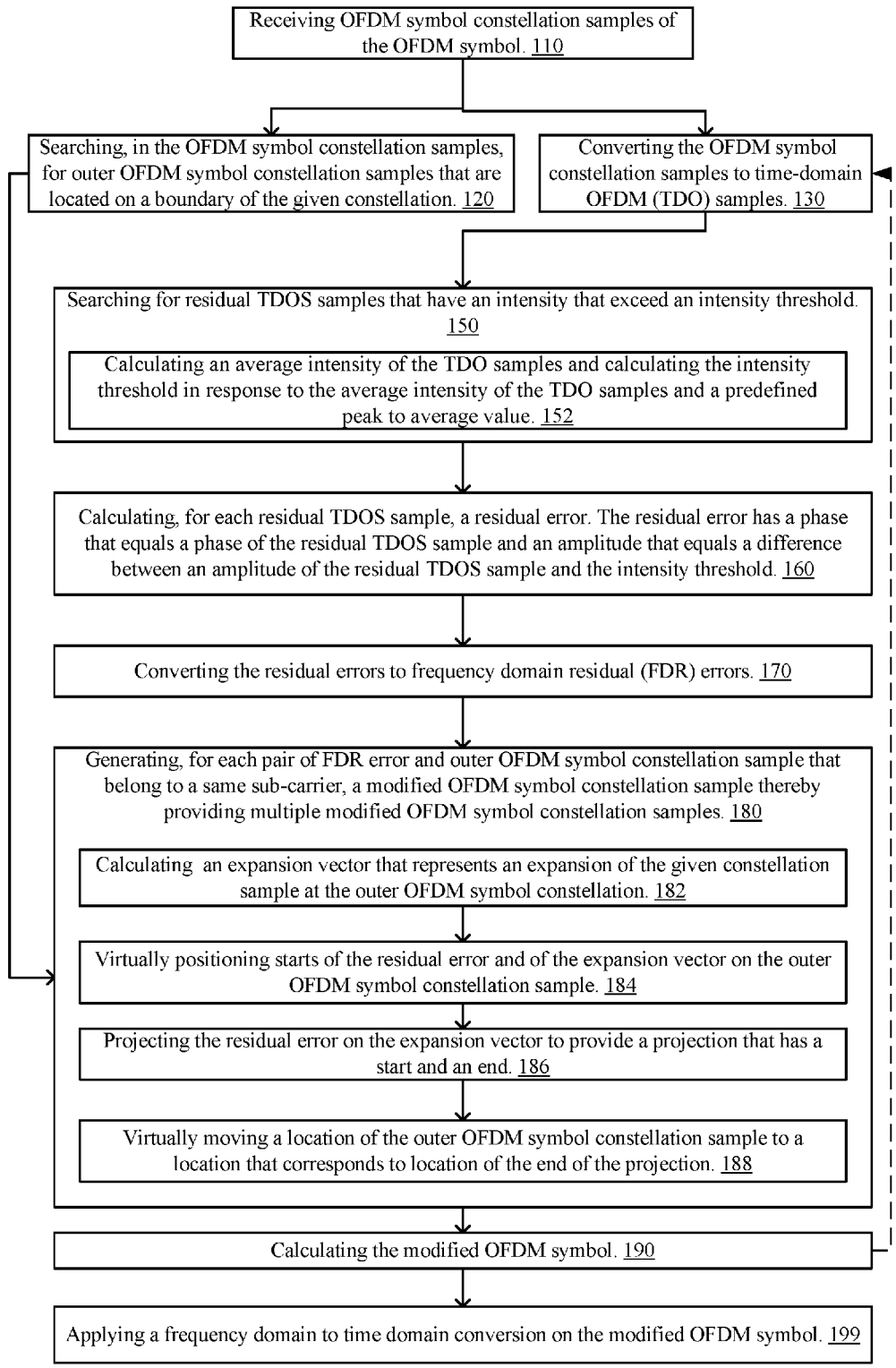
FIG. 1 illustrates a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Any reference to the term intensity should be applied mutatis mutandis to the term power. For example, an intensity threshold may be also a power threshold. Furthermore, the term intensity also refers to any other parameter that is derived from intensity (for example a square root of intensity, a derivative of intensity, and the like).

According to various embodiments of the invention there are provided systems, methods and computer readable media for modifying an OFDM symbol to provide a modified OFDM symbol that exhibits lower peak to average ratio and thus increase the efficiency of high power amplifiers.

According to an embodiment of the invention the modification includes changing the location of outer OFDM symbol constellation samples of the OFDM symbol. The changing is responsive to residual errors associated with excessive amplitude.

According to an embodiment of the invention the modification includes changing the location of OFDM symbol constellation samples (outer and inner) of the OFDM symbol. The changing is responsive to residual errors associated with excessive amplitude and to allowed error vector magnitudes.

Outer OFDM Symbol Constellation Sample Manipulation

FIG. 1 is a schematic illustration of method 100 of generating a modified orthogonal frequency division multiplexing (OFDM) symbol according to an embodiment of the invention.

Method 100 may start by step 110 of receiving OFDM symbol constellation samples of the OFDM symbol. The OFDM symbol constellation samples belong to a given constellation. The given constellation represents the type of modulation of the OFDM symbol constellation samples. Non-limiting examples of such modulation may include Quadrature amplitude modulation (QAM) or any other type of modulation. For convenience of explanation this paper will refer to a 16 QAM modulation:

| 0000 | 0100 | Q-axis | 1100 | 1000 |
| 0001 | 0101 | Q-axis | 1101 | 1001 |
| I-axis | I-axis | Origin | I-axis | I-axis |
| 0011 | 0111 | Q-axis | 1111 | 1011 |
| 0010 | 0110 | Q-axis | 1110 | 1010 |

Each OFDM symbol constellation sample corresponds to a unique sub-carrier.

Step 110 may be followed by steps 120 and 130.

Step 120 may include searching, in the OFDM symbol constellation samples, for outer OFDM symbol constellation samples that are located on a boundary of the given constellation. Step 120 may be followed by step 180.

Method 100 may include calculating a boundary vector that indicates which OFDM symbol constellation samples are outer OFDM symbol constellation samples. Different OFDM symbol constellation samples correspond to different sub-carriers. The boundary vector may include, for example, 1024 elements.

For example, in a 16 QAM constellation, the outer OFDM symbol constellation samples are those corresponding to values 0000, 0100, 1100, 1000, 1001, 1011, 1010, 1110, 0110, 0010, 0011 and 0001. The inner OFDM symbol constellation samples are those corresponding to values 0101, 1101, 1111 and 0111.

Step 130 may include converting the OFDM symbol constellation samples to time-domain OFDM (TDO) samples. This may include performing an Inverse Fast Fourier Transform (IFFT).

Step 130 may be followed by step 150 of searching for residual TDOS samples that have an intensity that exceed an intensity threshold.

According to an embodiment of the invention step 150 may include calculating an average intensity of the TDO samples and calculating the intensity threshold in response to the average intensity of the TDO samples and a predefined peak to average value. The predefined peal to average ratio may be determined in relation to a desired efficiency of the high power amplifier.

Step 150 may be followed by step 160 of calculating, for each residual TDOS sample, a residual error. The residual error has a phase that equals a phase of the residual TDOS sample and an amplitude that equals a difference between an amplitude of the residual TDIS sample and the intensity threshold.

Method 100 may include calculating a residual vector that represents which TDOS samples are residual TDOS samples. Each residual TDOS sample may be represented in the residual vector by its residual error.

Step 160 may be followed by step 170 of converting the residual errors to frequency domain residual (FDR) errors. This may include applying IFFT and/or discrete Fourier transform or any other transform. This may include converting the residual vector to a frequency domain residual vector.

Step 170 may be followed by step 180 of generating, for each pair of FDR error and outer OFDM symbol constellation sample that belong to a same sub-carrier, a modified OFDM symbol constellation sample thereby providing multiple modified OFDM symbol constellation samples. An OFDM symbol may include, for example, 1024 sub-carriers.

Step 180 may include at least some of steps 182, 184, 186 and 188.

Steps 182, 184, 186 and 188 are applied on each OFDM symbol constellation sample that belongs to a sub-carrier that is associated with an FDR error and outer OFDM symbol constellation sample.

Step 182 may include calculating an expansion vector that represents an expansion of the given constellation at the outer OFDM symbol constellation sample.

The expansion vector should be defined such as not to reduce the distance between any OFDM sample constellation samples, even after the modification.

For example, the expansion vectors of values 0100 and 1100 will be directed upwards (90 degrees), the expansion vectors of values 0110 and 1110 will be directed downwards (270 degrees), the expansion vectors of values 1001 and 1011 will be directed to the right (0 degrees), the expansion vectors of values 0001 and 0010 will be directed to the left (180 degrees), the expansion vector of value 1000 will be directed at 45 degrees, the expansion vector of value 0000 will be directed at 135 degrees, the expansion vector of value 0010 will be directed at 225 degrees and the expansion vector of value 1010 will be directed at 315 degrees.

Step 184 may include virtually positioning starts of the residual error and of the expansion vector on the outer OFDM symbol constellation sample.

Step 184 may be followed by step 185 of checking whether to ignore the residual error and leave the outer OFDM symbol constellation sample unmodified, whether to skip a projection of the residual error or to perform a projection of the residual error.

If ignoring—jumping to step 188" of not modifying the outer OFDM symbol constellation sample.

If determining not to project the residual error on the expansion vector—jumping to step 188' of virtually moving a location of the outer OFDM symbol constellation sample to a location that corresponds to the end of the residual error.

If determining to project—jumping to step 186 of projecting the residual error on the expansion vector to provide a projection that has a start and an end.

Step 188 may include virtually moving a location of the outer OFDM symbol constellation sample to a location that corresponds to location of the end of the projection. This provides the modified OFDM symbol constellation sample.

Step 188 may be followed by adding a cyclic prefix.

Step 180 may be followed by step 190 of calculating the modified OFDM symbol.

The calculating of the modified OFDM symbol may include performing a frequency domain to time domain conversion of (a) the multiple modified OFDM symbol constellation samples and (b) unmodified OFDM symbol constellation samples. The unmodified OFDM symbol constellation samples were not modified during method 100. They are associated with sub-carriers that did not include pairs of FDR errors and outer OFDM symbol constellation samples.

Method 100 may be executed in an iterative method. For example—if not all of the excess samples were modified—step 180 may be followed by step 130 and another iteration of steps 130, 140, 150, 160, 170 and 180 can be executed. The input (during each iteration) to step 180 is the modified OFDM symbol constellation symbols that were calculated during a previous iteration.

Step 190 may be followed by step 199 of performing frequency domain to time domain of the modified OFDM symbol.

Figure 2:
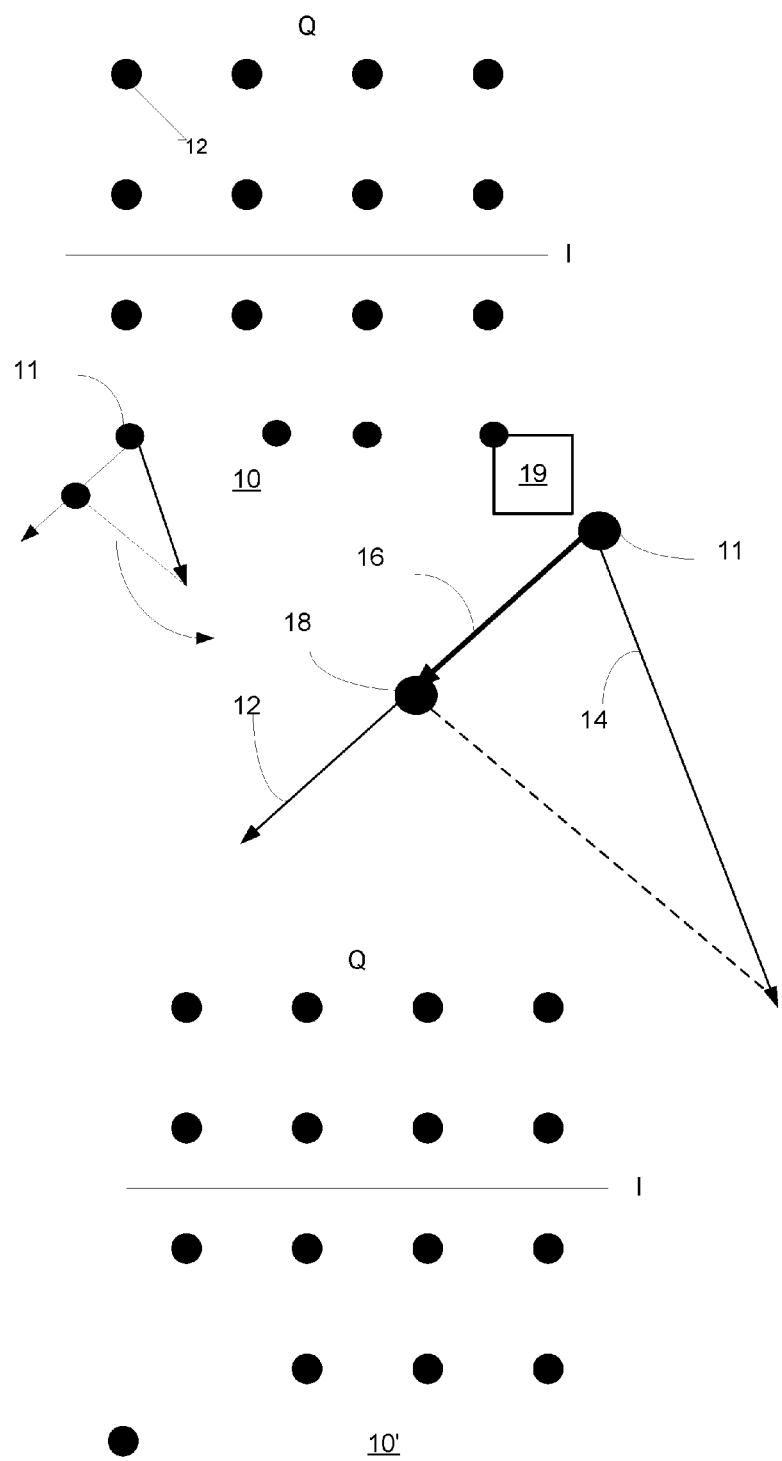
FIG. 2 illustrates a 16-QAM constellation, a OFDM symbol constellation sample, an expansion vector, a residual error, a projection of the residual error on the expansion error and a modified OFDM symbol constellation sample according to an embodiment of the invention.

FIG. 2 illustrates a 16-QAM constellation 10, an OFDM symbol constellation sample 11, an expansion vector 12, a residual error 14, a projection 16 of the residual error on the expansion error and a modified OFDM symbol constellation sample 18 according to an embodiment of the invention. The replacement of OFDM symbol constellation sample 11 by modified OFDM symbol constellation sample 18 provides a modified 16-QAM constellation 10'.

According to an embodiment of the invention any residual error that is related to a certain outer OFDM symbol constellation sample and increases the distance from an OFDM symbol constellation sample does not need to be projected to on the expansion vector and the modified OFDM symbol constellation sample may be moved to the end of the residual error vector. For example—the corner OFDM symbol constellation samples may a corner of an imaginary rectangular region (see for example region 19) wherein each residual error that falls within region 19 increases the distance from any other OFDM symbol constellation sample and there is no need to project the residual error on the expansion vector.

Furthermore—residual errors that extend inwards from a border OFDM symbol constellation sample—may be ignored (see arrow 12) and the border OFDM symbol constellation sample may remain unchanged.

EVM Clipping

The Error Vector Magnitude is a measure of the difference between the ideal symbols and the measured symbols after the equalization. This difference is called the error vector. The EVM result is defined as the square root of the ratio of the mean error vector power to the mean reference power expressed in percent.

For all bandwidths, the EVM measurement shall be performed over all allocated resource blocks and downlink sub-frames within 10 ms measurement periods. The boundaries of the EVM measurement periods need not be aligned with radio frame boundaries. The EVM value is then calculated as the mean square root of the measured values. The EVM for different modulation schemes on PDSCH shall be better than the following limits. QPSK—the required EVM does not exceed 17.5 percent. 16-QAM—the required EVM does not exceed 12.5 percent. 64-QAM—the required EVM does not exceed 8 percent.

Figure 3:
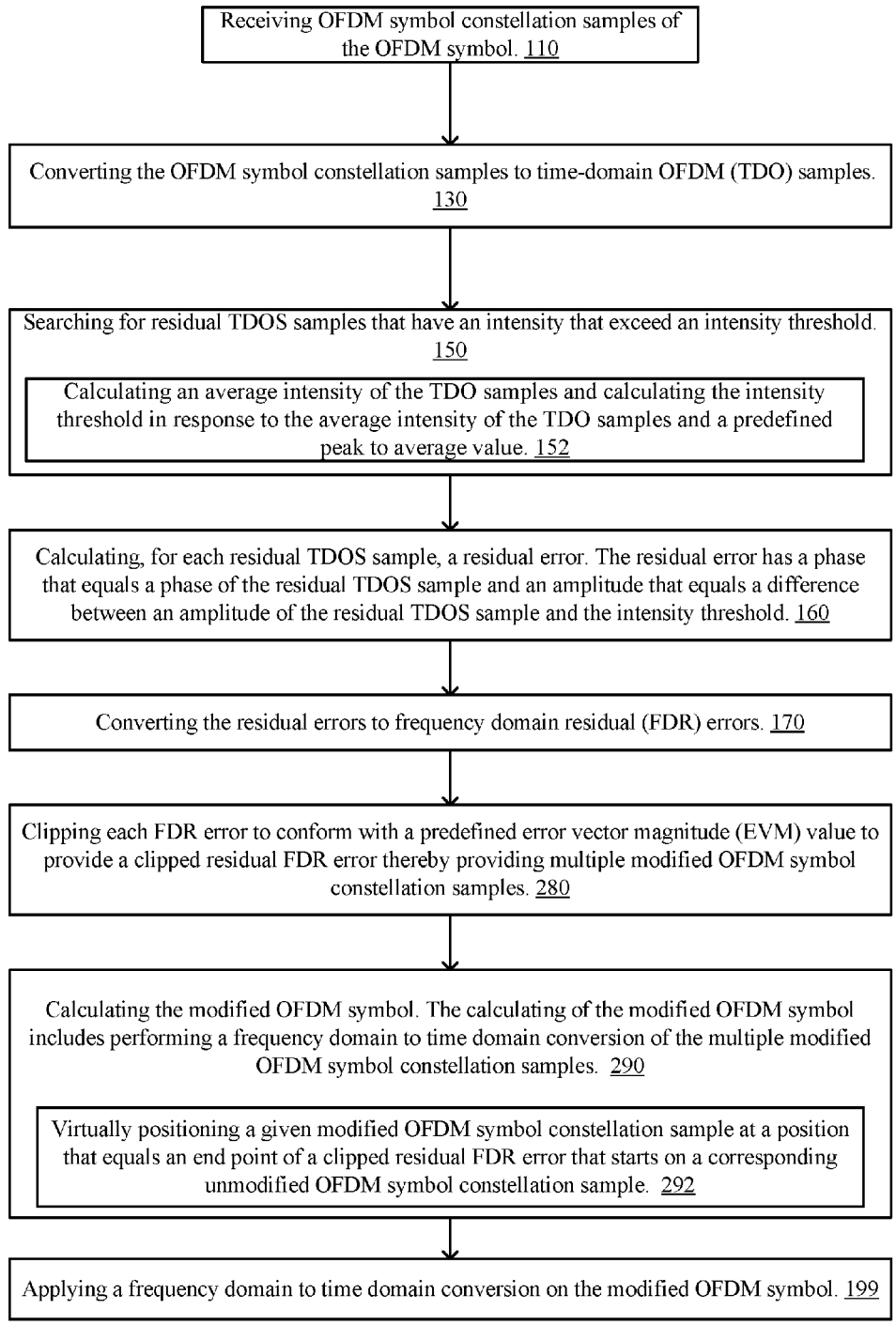
FIG. 3 illustrates a method according to an embodiment of the invention.

FIG. 3 illustrates method 200 according to an embodiment of the invention.

Method 200 may start by steps 110, 130, 150, 160 and 170.

Step 170 may be followed by step 280 of clipping each FDR error to conform to a predefined error vector magnitude (EVM) value to provide a clipped residual FDR error thereby providing multiple modified OFDM symbol constellation samples.

Step 280 may be followed by step 290 of calculating the modified OFDM symbol; wherein the calculating of the modified OFDM symbol comprises performing a frequency domain to time domain conversion of the multiple modified OFDM symbol constellation samples.

Step 150 may include calculating an average intensity (for example RMS) of the TDO samples and calculating the intensity threshold in response to the average intensity of the TDO samples and a predefined peak to average ratio (desired PAPR).

Step 290 may include step 292 of virtually positioning a given modified OFDM symbol constellation sample at a position that equals an end point of a clipped residual FDR error that starts on a corresponding unmodified OFDM symbol constellation sample.

Step 290 may be followed by step 199 of performing frequency domain to time domain of the modified OFDM symbol.

Figure 4:
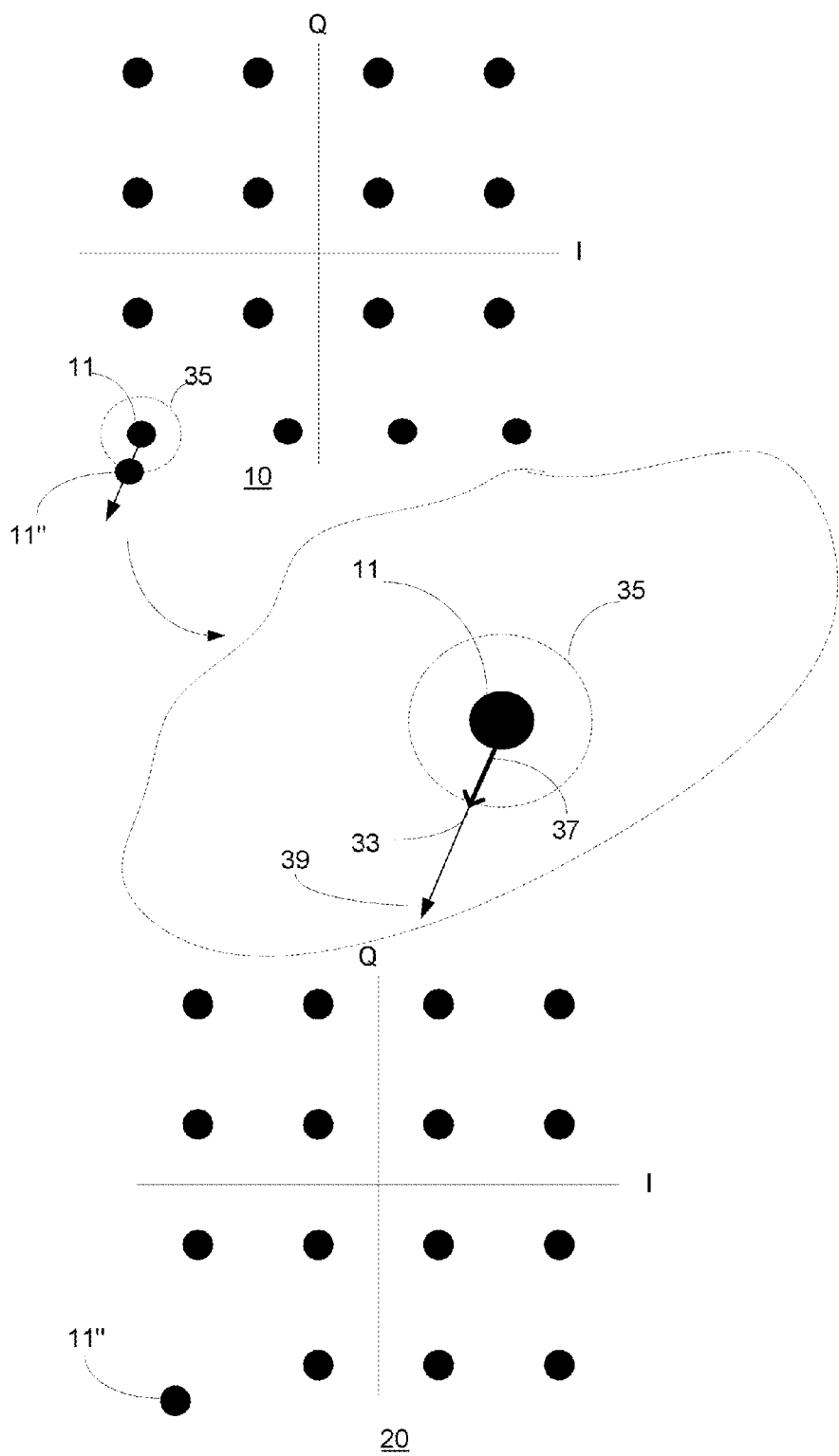
FIG. 4 illustrates a 16-QAM constellation, an OFDM symbol constellation sample, a round shaped EVM region, a residual error, a clipped residual error, an end of the clipped residual error, and a modified OFDM symbol constellation sample, according to an embodiment of the invention.

FIG. 4 illustrates a 16-QAM constellation 10, an OFDM symbol constellation sample 11, a round shaped EVM region 35, a residual error 39, a clipped residual error 37, an end 33 of the clipped residual error, and a modified OFDM symbol constellation sample 11" located at end 33, according to an embodiment of the invention. The replacement of OFDM symbol constellation sample 11 by modified OFDM symbol constellation sample 11" provides a modified 16-QAM constellation 20.

Figure 5:
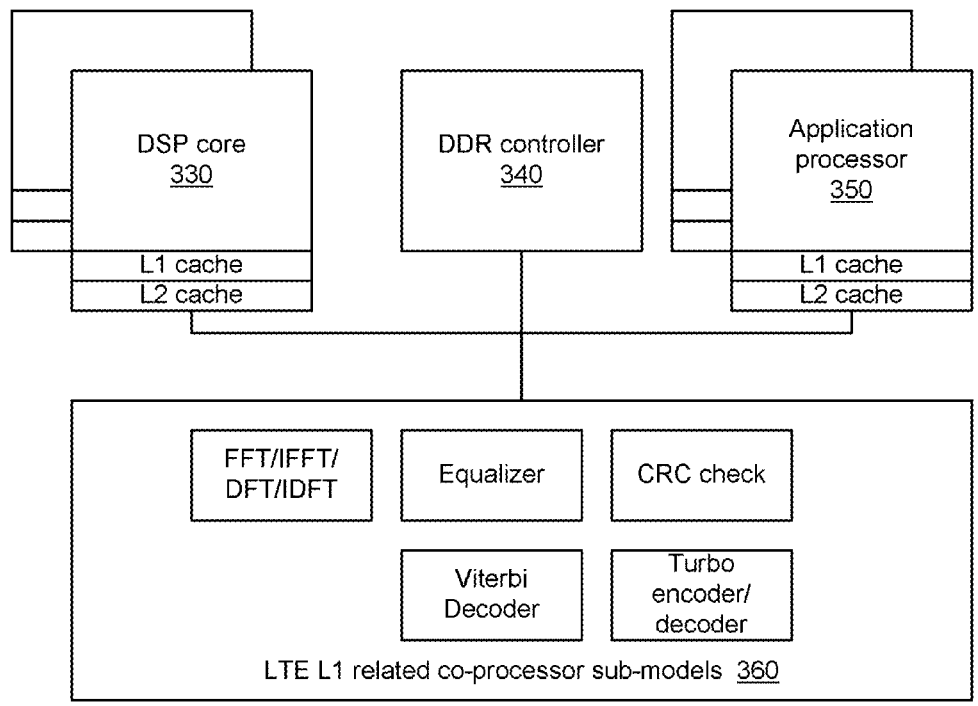
FIG. 5 is a schematic illustration of system according to an embodiment of the invention.
Figure 6:
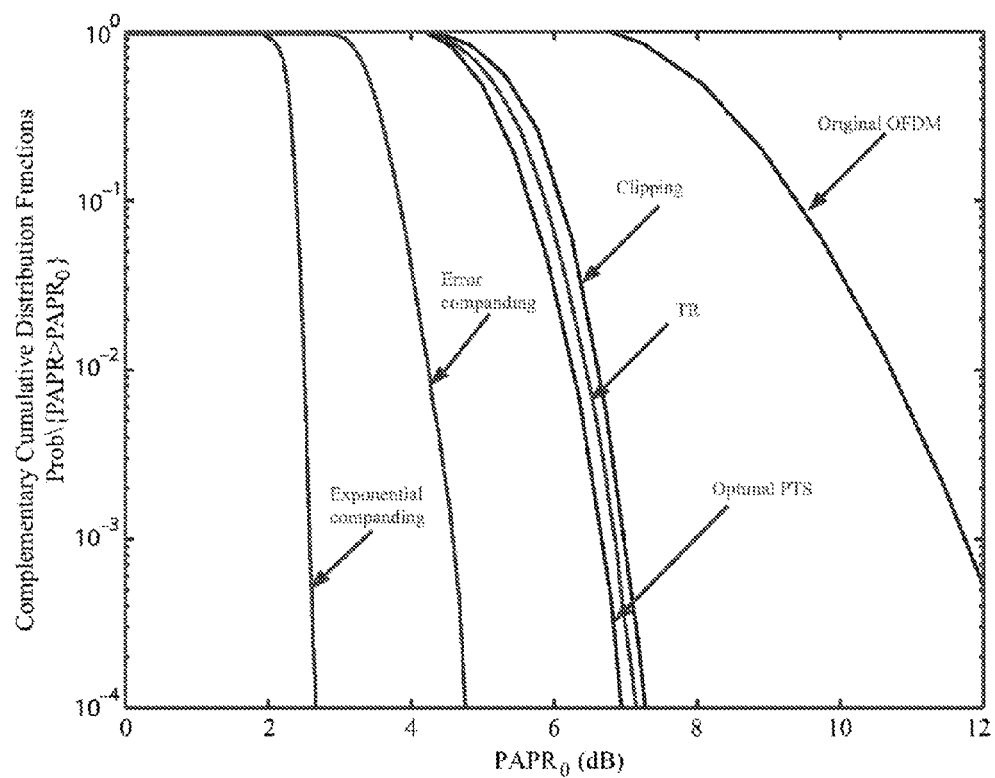
FIG. 6-7 illustrate performances of prior art methods.
Figure 7:
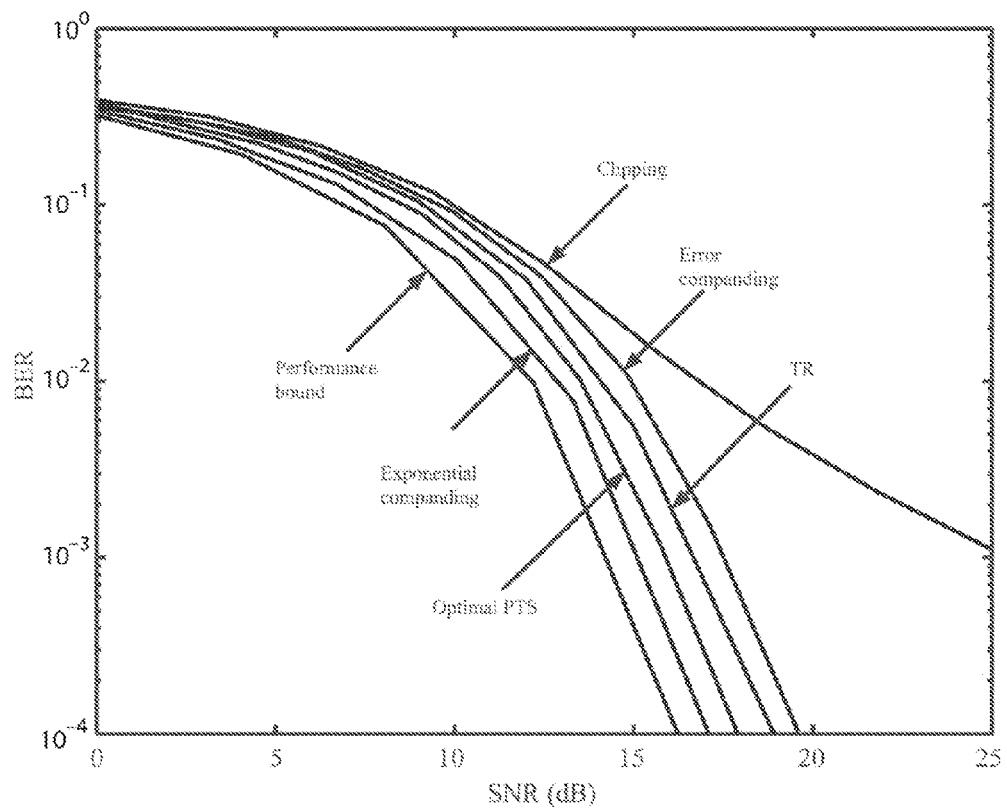

FIG. 5 illustrates a system 300 according to an embodiment of the invention.

System 300 may be any type of a computerized system with computational capabilities. For example it is assumed that system 300 is a system on chip (SOC) such as a small cell SOC.

System 300 may include one or more digital signal processor (DSP) cores 310, each with a level one (L1) and level two (L2) caches, one or more double data rate (DDR) controllers 320, one or more application processors 330 each with a level one (L1) and level two (L2) caches, and co-processor modules such as a LTE L1 co-processor modules 340—equalizer, CRC check, Viterbi decoder, equalizer and converters between time domain and frequency domain (FFT, IFFT, DFT, IDFT).

Any combination of digital signal processor and hardware accelerators can be provided.

System 300 is capable of executing any one of methods 100 and 200.

A DSP core may execute a management code that determines which blocks of the system 300 will execute each step of method 100 and/or 200. For example, the management code may determine which one of a DSP core and a time domain and frequency converter will execute time to frequency domain (and/or frequency domain to time domain) conversion. The determination may be an outcome of a load balancing scheme, of a distributed (pipelined) execution of any one of methods 100 and 200.

The pseudo-code illustrated below is a non-limiting example for executing some of the steps of method 200.

—Error Vector Calculation
1. Per each OFDM symbol n Find the sample k which reach above the desired PAPR (DesiredPeakRatio*CalcRMS[n])
2. For each sample calculate the residual error that preserves the phase of the residual sample.

—Pseudo Code—Preparation for DFT Approach:
DesiredPeak=DesiredPeakRatio*CalcRMS[n]
For k=0, k<SymbolLength, k++
If Sample[k]> DesiredPeak
   OvershootInd[i++]=k
   SampleError[i++]=(1−DesiredPeak*1./abs(Sample(k)))
.*Sample(k) End —Pseudo Code—Preparation for FFT Approach:
DesiredPeak=DesiredPeakRatio*CalcRMS[n]
Temp=(1−DesiredPeak*1./abs(Sample)).*Sample %//Vector
SampleError=max(Temp, 0) %//Vector Converting the residual errors to frequency domain residual (FDR) errors—Frequency transform of the Sample Error vector using DFT since the number of error values which isn't 0 is sparse. It also possible to use ordinary FFT (DFTResidual).

Calculate modified OFDM symbol—Bound the error vector by the allowed EVM, clip the error vector accordingly and maintain the error phase.

Pseudo Code:
EVMVec=Allowed EVM per constellation (QPSK, 16QAM,64QAM etc)
AfterCorr=FFTS amp+(min([abs(EVMVec*FFTSamp).';
abs(DFTResidual).']).
*(exp(j*angle(DFTResidual))).').';

—IFFT+CP insertion−Final IFFT and CP insertion for modified OFDM symbol.

—Calculate RMS of modified OFDM symbol−Update RMS according to new OFDM symbol (Could be calculated after first IFFT)

Pseudo Code:
OFDMSymbolRMS=sqrnmean(Sample*.conj(Sample)))
CalcRMS[n]=Alpha*OFDMSymbolRMS+(1−Alpha) CalcRMS[n−1]

The suggested methods may be provided for OFDM and SC-FDMA waveforms such as LTE (DL/UL), 802.11, Wimax, and may provide:
  a. Better Utilization of Available accelerator in small Cell SoC architecture (FFT/DFT/IFET/IDFT).
  b. No need for up-sampling (e.g Clipping+OOB nulling).
  c. No need for multiple iterations
  d. Avoid spectral mask spurious
  e. Robust for Modulation Order. 6. No need for side info to receiver.

Figure 8:
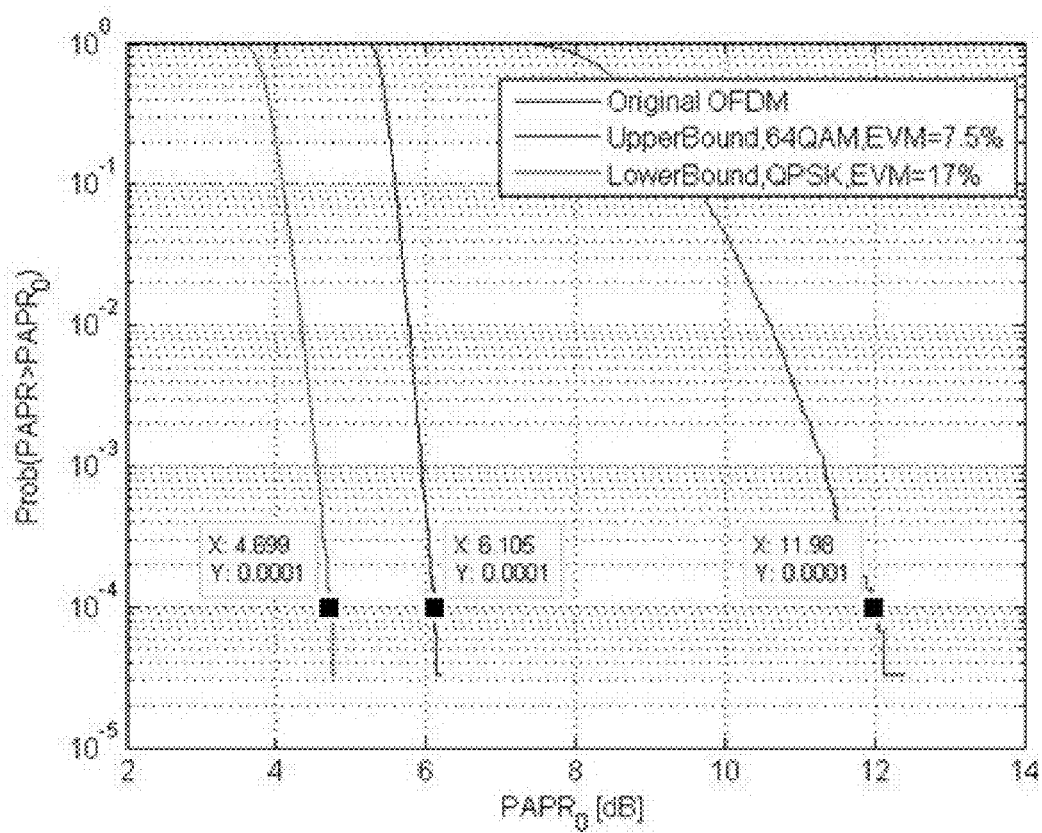
FIG. 8 illustrates an outcome of a simulation of a method according to an embodiment of the invention.

FIG. 8 illustrates an outcome of a simulation of method 200 that shows that method 200 may reduce the PAPR between 6 to 7.5 dB according to the constellation. Upper bound is defined by the higher constellation which is 64QAM and the lower bound is defined by the lower constellation which is QPSK.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for generating a modified orthogonal frequency division multiplexing (OFDM) symbol, the method comprises:
    receiving OFDM symbol constellation samples of the OFDM symbol; wherein the OFDM symbol constellation samples belong to a given constellation;
    searching, in the OFDM symbol constellation samples, for outer OFDM symbol constellation samples that are located on a boundary of the given constellation;
    converting the OFDM symbol constellation samples to time-domain OFDM (TDOS) samples;
    searching for residual TDOS samples that have an intensity that exceed an intensity threshold;
    calculating, for each residual TDOS sample, a residual error; wherein the residual error has a phase that equals a phase of the residual TDOS sample and an amplitude that equals a difference between an amplitude of the residual TDOS sample and the intensity threshold;
    converting the residual errors to frequency domain residual (FDR) errors;
    calculating, for each outer OFDM symbol constellation sample, an expansion vector that represents an expansion of the given constellation at the outer OFDM symbol constellation sample;
    generating, for each pair of FDR error and outer OFDM symbol constellation sample that belong to a same sub-carrier, a modified OFDM symbol constellation sample thereby providing multiple modified OFDM symbol constellation samples; and
    calculating the modified OFDM symbol; wherein the calculating of the modified OFDM symbol comprises performing a frequency domain to time domain conversion of (a) the multiple modified OFDM symbol constellation samples and (b) unmodified OFDM symbol constellation samples; and
    wherein for each outer OFDM symbol constellation sample the expansion vector starts from the outer OFDM symbol constellation sample and expands outwards from the OFDM symbol constellation at a direction that does not reduce a distance between any OFDM sample constellation samples, including modified OFDM symbols.

2. The method according to claim 1, wherein the OFDM symbol constellation is a rectangular OFDM symbol constellation; wherein the expansion vector of each outer OFDM symbol constellation sample that is not positioned at a cornet of the OFDM symbol constellation is normal to a line of outer OFDM symbol constellation samples that includes the outer OFDM symbol constellation sample; and wherein the expansion vector of each outer OFDM symbol constellation sample that is positioned at a cornet of the OFDM symbol constellation is oriented, in relation to a longitudinal axis of the OFDM symbol constellation by an angle that has an absolute value of forty five degrees.

3. The method according to claim 1 wherein the generating of each modified OFDM symbol constellation sample is generated without decreasing a distance between the modified OFDM symbol constellation sample and any other modified or unmodified OFDM symbol constellation sample.

4. The method according to claim 1 comprising calculating a modified OFDM symbol constellation sample that is associated with an outer OFDM symbol constellation sample, an expansion vector and a residual error, by:
    virtually positioning starts of the residual error and of the expansion vector on the outer OFDM symbol constellation sample;
    projecting the residual error on the expansion vector to provide a projection that has a start and an end; and
    virtually moving a location of the outer OFDM symbol constellation sample to a location that corresponds to location of the end of the projection.

5. The method according to claim 1, comprising calculating an average intensity of the TDOS samples and calculating the intensity threshold in response to the average intensity of the TDOS samples and a predefined peak to average value.

6. The method according to claim 1, comprising converting the residual errors to FDR errors by applying a discrete Fourier transform.

7. The method according to claim 1, comprising determining, by a digital signal processing (DSP) core of a cell system on chip (SOC), whether to execute at least one of steps (a) converting the OFDM symbol constellation samples to TDOS samples, (b) converting the residual errors to FDR errors, and (c) calculating of the modified OFDM symbol, by the DSP core or a co-processor of the SOC.

8. A method for generating a modified orthogonal frequency division multiplexing (OFDM) symbol, the method comprises:
receiving OFDM symbol constellation samples of the OFDM symbol; wherein the OFDM symbol constellation samples belong to a given constellation;
converting the OFDM symbol constellation samples to time-domain OFDM (TDO) samples;
searching for residual TDO samples that have an intensity that exceed an intensity threshold;
calculating, for each residual TDOS sample, a residual error; wherein the residual error has a phase that equals a phase of the residual TDOS sample and an amplitude that equals a difference between an amplitude of the residual TDIS sample and the intensity threshold
converting the residual errors to frequency domain residual (FDR) errors;
clipping each FDR error to conform with an error vector magnitude to provide a clipped residual FDR error thereby providing multiple modified OFDM symbol constellation samples; and
calculating the modified OFDM symbol; wherein the calculating of the modified OFDM symbol comprises performing a frequency domain to time domain conversion of the multiple modified OFDM symbol constellation samples.

9. The method according to claim 8, comprising calculating an average intensity of the TDOS samples and calculating the intensity threshold in response to the average intensity of the TDOS samples and a predefined peak to average value.

10. The method according to claim 8 wherein a given modified OFDM symbol constellation sample is virtually positioned at a position that equals an end point of a clipped residual FDR error that starts on a corresponding unmodified OFDM symbol constellation sample.

11. A non-transitory computer readable medium that stores instructions that once executed by a computerized system that comprises a hardware accelerator and a processor to execute the stages of:
receiving OFDM symbol constellation samples of the OFDM symbol; wherein the OFDM symbol constellation samples belong to a given constellation;
searching, in the OFDM symbol constellation samples, for outer OFDM symbol constellation samples that are located on a boundary of the given constellation;
converting the OFDM symbol constellation samples to time-domain OFDM (TDOS) samples;
searching for residual TDOS samples that have an intensity that exceed an intensity threshold;
calculating, for each residual TDOS sample, a residual error; wherein the residual error has a phase that equals a phase of the residual TDOS sample and an amplitude that equals a difference between an amplitude of the residual TDOS sample and the intensity threshold
converting the residual errors to frequency domain residual (FDR) errors;
calculating, for each outer OFDM symbol constellation sample, an expansion vector that represents an expansion of the given constellation at the outer OFDM symbol constellation sample;
generating, for each pair of FDR error and outer OFDM symbol constellation sample that belong to a same sub-carrier, a modified OFDM symbol constellation sample thereby providing multiple modified OFDM symbol constellation samples; and
calculating the modified OFDM symbol; wherein the calculating of the modified OFDM symbol comprises performing a frequency domain to time domain conversion of (a) the multiple modified OFDM symbol constellation samples and (b) unmodified OFDM symbol constellation samples; and
wherein for each outer OFDM symbol constellation sample the expansion vector starts from the outer OFDM symbol constellation sample and expands outwards from the OFDM symbol constellation at a direction that does not reduce a distance between any OFDM sample constellation samples, including modified OFDM symbols.

12. The non-transitory computer readable medium according to claim 11, wherein the OFDM symbol constellation is a rectangular OFDM symbol constellation; wherein the expansion vector of each outer OFDM symbol constellation sample that is not positioned at a cornet of the OFDM symbol constellation is normal to a line of outer OFDM symbol constellation samples that includes the outer OFDM symbol constellation sample; and wherein the expansion vector of each outer OFDM symbol constellation sample that is positioned at a cornet of the OFDM symbol constellation is oriented, in relation to a longitudinal axis of the OFDM symbol constellation by an angle that has an absolute value of forty five degrees.

13. The non-transitory computer readable medium according to claim 11 wherein the generating of each modified OFDM symbol constellation sample is generated without decreasing a distance between the modified OFDM symbol constellation sample and any other modified or unmodified OFDM symbol constellation sample.

14. The non-transitory computer readable medium according to claim 11 that stores instructions for calculating a modified OFDM symbol constellation sample that is associated with an outer OFDM symbol constellation sample, an expansion vector and a residual error, by:
virtually positioning starts of the residual error and of the expansion vector on the outer OFDM symbol constellation sample;
projecting the residual error on the expansion vector to provide a projection that has a start and an end; and
virtually moving a location of the outer OFDM symbol constellation sample to a location that corresponds to location of the end of the projection.

15. The non-transitory computer readable medium according to claim 11, that stores instructions for calculating an average intensity of the TDOS samples and calculating the intensity threshold in response to the average intensity of the TDOS samples and a predefined peak to average value.

16. The non-transitory computer readable medium according to claim 11, that stores instructions for converting the residual errors to FDR errors by applying a discrete Fourier transform.

17. The non-transitory computer readable medium according to claim 11, that stores instructions for determining, by a digital signal processing (DSP) core of a cell system on chip (SOC), whether to execute at least one of steps (a) converting the OFDM symbol constellation samples to TDOS samples, (b) converting the residual errors to FDR errors, and (c) calculating of the modified OFDM symbol, by the DSP core or a co-processor of the SOC.

18. A method for generating a modified orthogonal frequency division multiplexing (OFDM) symbol, the method comprises:

receiving OFDM symbol constellation samples of the OFDM symbol; wherein the OFDM symbol constellation samples belong to a given constellation;

converting the OFDM symbol constellation samples to time-domain OFDM (TDOS) samples;

searching for residual TDOS samples that have an intensity that exceed an intensity threshold;

calculating, for each residual TDOS sample, a residual error; wherein the residual error has a phase that equals a phase of the residual TDOS sample and an amplitude that equals a difference between an amplitude of the residual TDIS sample and the intensity threshold converting the residual errors to frequency domain residual (FDR) errors;

clipping each FDR error to conform with an error vector magnitude to provide a clipped residual FDR error thereby providing multiple modified OFDM symbol constellation samples; and calculating the modified OFDM symbol; wherein the calculating of the modified OFDM symbol comprises performing a frequency domain to time domain conversion of the multiple modified OFDM symbol constellation samples.

19. The non-transitory computer readable medium according to claim 18, that stores instructions for calculating an average intensity of the TDOS samples and calculating the intensity threshold in response to the average intensity of the TDOS samples and a predefined peak to average value.

20. The non-transitory computer readable medium according to claim 18 wherein a given modified OFDM symbol constellation sample is virtually positioned at a position that equals an end point of a clipped residual FDR error that starts on a corresponding unmodified OFDM symbol constellation sample.

* * * * *